(12) United States Patent
Pronovost et al.

(10) Patent No.: US 8,946,118 B2
(45) Date of Patent: Feb. 3, 2015

(54) REMOVAL OF HYDROPHOBIC CONTAMINANTS

(71) Applicant: Red Lion Chem Tech, LLC, San Diego, CA (US)

(72) Inventors: Allan D. Pronovost, San Diego, CA (US); Michael E. Hickey, Escondido, CA (US)

(73) Assignee: Red Lion Chem Tech, LLC, San Diego, CA (US)

(*) Notice: Subject to any disclaimer, the term of this patent is extended or adjusted under 35 U.S.C. 154(b) by 0 days.

(21) Appl. No.: 13/781,542

(22) Filed: Feb. 28, 2013

(65) Prior Publication Data

US 2014/0018600 A1    Jan. 16, 2014

Related U.S. Application Data

(60) Provisional application No. 61/670,041, filed on Jul. 10, 2012.

(51) Int. Cl.
*B01J 20/283* (2006.01)
*B01J 20/22* (2006.01)
*B01J 20/26* (2006.01)

(52) U.S. Cl.
CPC ............... *B01J 20/22* (2013.01); *B01J 20/265* (2013.01)
USPC .......................................... 502/407; 502/400

(58) Field of Classification Search
CPC ........... B01J 20/02; B01J 20/22; B01J 20/283
See application file for complete search history.

(56) References Cited

U.S. PATENT DOCUMENTS

| | | |
|---|---|---|
| 5,013,335 A | 5/1991 | Marcus |
| 5,037,557 A | 8/1991 | Warrenchak et al. |
| 5,401,486 A | 3/1995 | Mueller et al. |
| 5,855,860 A | 1/1999 | Nishimine et al. |
| 7,728,187 B2 * | 6/2010 | Kulprathipanja et al. .... 585/828 |
| 2004/0003723 A1 | 1/2004 | Ueno et al. |
| 2004/0055957 A1 | 3/2004 | Palm et al. |
| 2008/0308465 A1 | 12/2008 | Osaheni et al. |
| 2009/0114093 A1 * | 5/2009 | Li et al. ........................... 95/135 |
| 2009/0326308 A1 * | 12/2009 | Kulprathipanja et al. .... 585/820 |
| 2010/0025373 A1 | 2/2010 | Barthel et al. |
| 2010/0037773 A1 | 2/2010 | Minhas et al. |
| 2011/0179948 A1 * | 7/2011 | Choi et al. ...................... 95/114 |
| 2011/0204283 A1 | 8/2011 | Davis et al. |
| 2011/0212830 A1 | 9/2011 | Russo |
| 2011/0244382 A1 | 10/2011 | Christopher et al. |
| 2012/0046165 A1 | 2/2012 | Lu et al. |
| 2014/0178626 A1 * | 6/2014 | Min et al. ........................ 428/69 |

FOREIGN PATENT DOCUMENTS

| | | |
|---|---|---|
| JP | 59126489 | 7/1984 |
| WO | WO-2006/017919 | 2/2006 |
| WO | WO-2013/009744 | 1/2013 |

OTHER PUBLICATIONS

Applicant Admitted Prior Art; paragraph [0023], (as cited on International Search report for PCT/US2013/049927, mailed Dec. 6, 2013).

International Search Report and Written Opinion for PCT/US2013/49927, mailed Dec. 6, 2013, 10 pages.

* cited by examiner

*Primary Examiner* — Tam M Nguyen
(74) *Attorney, Agent, or Firm* — Morrison & Foerster LLP

(57) ABSTRACT

Compositions and methods are disclosed for remediating environmental contaminants when such contaminants primarily include hydrophobic materials such as petroleum.

13 Claims, No Drawings

REMOVAL OF HYDROPHOBIC CONTAMINANTS

CROSS-REFERENCE TO RELATED APPLICATIONS

This application claims priority from U.S. Ser. No. 61/670,041 filed 10 Jul. 2012. The content of this document is incorporated by reference herein in its entirety.

TECHNICAL FIELD

The invention relates to compositions and methods for remediating environments where said environments contain unwanted hydrophobic materials. More particularly, it concerns, for example, remediation and recovery of oil from oil spills, seepages, and related accidents associated with the petroleum industry, as well as cleansing environments of oil, containing decomposed materials such as plants, animals and animal wastes from water or soil.

BACKGROUND ART

Oil spills appear to be an endemic problem associated with globalized industrialization. The massive spill from a tanker a decade ago off the coast of Alaska and more recently the massive oil spill in the Gulf of Mexico has dramatized this problem. There appear to be no easy and satisfactory solutions once the spill has occurred. Various approaches have been attempted, including the use of dispersants, which are themselves often highly toxic to fish and wildlife, and the use of materials to coagulate the oil, including hay, human hair, shredded tire rubber, pulverized plastics, etc. These "solutions" create their own problems and do not resolve the underlying contamination.

It is understood that spilled oil or other petroleum products may contain a continuum of hydrocarbon components from light, sweet crude, relatively high in alkanes and other petroleum distillates, such as diesel, to heavier crude oil with high asphaltene contents. These heavier components may increase in concentration as the lighter crude evaporates, also part of the problem.

Generally, crude oil also contains malodors, some of them due to organic volatiles and some due to contamination and decomposition of organic matter such as phytoplankton. Crude oil often also contains heavy metals such as mercury, lead, chromium and arsenic. These pass into the water column readily.

Problems are also posed by the uncontrolled disposal of agricultural wastes which may leach into various unwanted locations such as lagoons and rivers. Decomposed plant and animal remains also may be a problem. Agricultural wastes may contain large amounts of fatty acids and fat material due to decomposition. Satisfactory approaches for cleaning up environments in general, are not notably readily available.

The present invention provides a new approach to cleansing environments contaminated with hydrophobic materials which may also include other undesirable components. In the case of petroleum-related contaminations, recovery of the oil is also effected.

DISCLOSURE OF THE INVENTION

The compositions of the invention are sorbent materials that have both absorption and adsorption capabilities and which solidify petroleum based liquid wastes. They associate preferentially with hydrophobic components by association with similar hydrophobic substances in the composition and also absorb hydrocarbons into the interior of the matrices. The oil sorbents are based on nanoparticulate silica compositions that are derivatized to provide hydrophobic surfaces on the nanoparticles that associate with materials of similar hydrophobicity. Because the nanoparticles in the compositions are themselves intricate matrices of silane-based chains, they can behave as clathrate hosts and absorb the hydrocarbons into the matrices themselves. The compositions may contain other facilitating components that enhance the sorbency with regard to polar materials such as malodorous compounds as well and may further contain additional components that effect ease of handling and the ability to capture other unwanted components such as heavy metals.

Thus, in one aspect, the invention is directed to compositions that comprise methylated and butylated and tertbutylated fumed silica nanoparticles and nanostrands of varying degrees of hydrophobicity that sorb hydrocarbons to form a solid mass that is buoyant in water. The ability to solidify the hydrocarbons is associated with the properties of the nanoparticles and nanostrands but can also be assisted by additional components, such as zeolites or siliceous volcanic rock preparations. Addition of such materials permits formation of a solid cake from liquid hydrocarbon deposits.

In another aspect, the invention is directed to a method to remediate environments affected by oil spills and also to recover the oil by applying the compositions of the invention to obtain a resulting solid cake, and then heating to dissociate the oil from the solid matrix followed by filtration or floatation.

In still other aspects, the invention is directed to the compositions described above but with further components added, such as adsorbents for heavy metals, highly hydroxylated silicas formed from fuming silica to a high temperature to create nanoparticles with high concentrations of hydroxyl groups on their surfaces, thus providing hydrogen bonding for electron donors contained in the material to be sorbed into the composition and even the ability to absorb oil by mixed clathrate formation. Additional materials that sorb fatty acids, or nitrogen may also be included. These compositions may also be used in methods to clear environments of decomposed material, including animal waste.

MODES OF CARRYING OUT THE INVENTION

The present invention provides a new approach to environmental remediation which is dependent on the design of compositions specifically both to absorb and to adsorb unwanted materials in the environment, in the case of the present invention, wherein said materials contain as major components hydrophobic substances that associate with similar components in the compositions. The hydrocarbon-sorbing components in the compositions of the invention are modified fumed silica nanoparticulate compositions. The nanoparticles are typically 5-20 nm in diameter, more typically 10-12 nm in diameter, occur in short chains, and have been treated with various methylating, butylating or tertbutlayting agents to create hydrophobic surfaces. Preferably a number of levels of hydrophobicity will be present in the compositions. This alone is sufficient to provide buoyancy and conversion of the hydrocarbons into a floatable mass with the properties of a solidifier but without chemical transformation.

For example, nanoparticulate fumed silica treated with dimethyl dichlorosilane replaces some of the hydroxyls on the surface of the silica with methyl groups thus increasing the hydrophobicity of the surface, attracting aliphatic and aromatic hydrocarbons into a three-dimensional labyrinth. A suitable commercial product is available from Cabot as Cab-O-Sil® TS-610.

Additional hydrophobicity is obtained by treating the fumed silica nanoparticulates with polydimethylsiloxane. This polymer of the formula

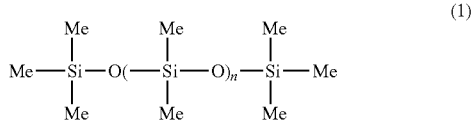

provides additional methyl groups to the composition in general. A suitable commercial product is available from Cabot as Cab-O-Sil® TS-720.

A still more hydrophobic form is obtained when the surface of the fumed silica is reacted with hexamethyldisilazane of the formula

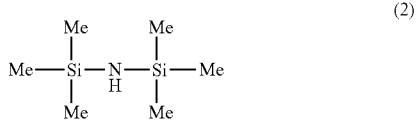

which also results in a more highly methylated surface. This is also commercially available from Cabot under the trade name Cab-O-Sil® TS-530.

Preferably, mixtures of these are used in the composition, and collectively absorb aliphatic and aromatic hydrocarbons. The portion of the composition comprised by the alkylated silica in typically 0.1-99.9%, preferably 1-15% by weight.

These essential components account for the ability to both absorb and adsorb the aliphatic and aromatic components of crude oil, as well as hydrophobic breakdown products of decomposing living systems and wastes. The relative proportions of the three forms of derivatized fumed silica are dependent on the nature of the material to be sorbed. The proportion to be added can vary from 0 to 100% but typically a ratio of 1:1:1 is useful.

The invention compositions preferably also include a component that provides hydrogen bonding to materials that are capable of donating electrons to hydroxyl groups. Such materials exist in oil spills and are often malodorous, and clearly exist in decomposing animal, plant and waste matter. The preferred component is highly fumed silica with very high levels of hydroxylation on its surface. Because of its high surface area, it also forms clathrates, even with oil as the guest molecule. In the highest grades, for example, 5 g of the material provides a surface area of 10 football fields with 8-10 hydroxylations per nm$^2$ prominent on the surface. The exceptionally high degree of hydroxylation on the surface that provides this capability results in high electrostatic adherence to solids, and can make handling difficult. This is easily mitigated, however, by addition of carrier particles such as bentonites, zeolites, or perlite. Various levels of fumed silica are available commercially in grades of 150-400 with increasing levels of hydroxylation in terms of hydroxyls available per square nanometer. The high grade material preferred in the present invention compositions is also available from Cabot as Cab-O-Sil® EH-5.

The highly hydroxylated nature of this fumed silica results in effective control of malodors associated with the volatile components of oil and also stabilizes the dissolved oils in water. When carriers such as bentonite, zeolite or perlite are added, the composition becomes abrasive and interacts effectively with oil-coated materials such as rocks, sand and pilings.

The percentage of the highly hydroxylated component in the composition varies with the level of contaminant for which it is intended, and it is typically provided in the range of 5-40% by weight, preferably 10-15% by weight.

As noted above, the compositions of the invention may also contain preparations of granulated siliceous volcanic rock, commonly known as perlite, which occurs naturally in volcanic regions. Unlike other volcanic minerals, it can expand 4 to 20 times its original volume when heated to higher temperatures. When heated above 1600° F., crushed perlite expands like popcorn.

The presence of significant amounts of this component in the compositions of the invention is helpful in solidifying the compositions when oil is sorbed as well as enhancing the buoyancy of the solid cakes formed. Typical proportions by weight of these perlite components are in the range of 0-80%, preferably 60-75%. The higher percentages are desirable when heavy grades of crude oil are to be sorbed. This component is also available commercially as Harborlite® from World Minerals, Inc., of Santa Barbara, Calif.

Where the environment to be remediated also contains heavy metal contaminants, at least one additional component which removes heavy metals specifically is desirable. Suitable materials include nanoparticulate nanocage ceramic sorbents that contain cationic ion exchangers with specificity for heavy metals, such as lead, arsenic and mercury even in the presence of competing ions such as calcium and magnesium. The heavy metals are trapped in the ceramic matrix, whereas the smaller metal ions responsible for hardness of water are not. Suitable material abbreviated "ATS" are available from BASF. The portion of the compositions that comprise cationic trapping agents such as ATS will vary with the nature of the spill but are typically in the range of 0.1-5% by weight, preferably 1.5-2.5% by weight.

It is generally not necessary to include components that will absorb nitrogen-containing compounds in compositions that are intended for oil spills, but compositions designed for removal and neutralization of decomposing animal waste materials preferably contain such components. Suitable nitrogen-sorbing components are the zeolites, which are aluminosilicates. These are provided in various particle sizes, and are effective in removing ammonia and hydrogen sulfide. These zeolites are also commercially available. For example, a suitable composition is ZK406H® which is a potassium aluminosilicate, a natural clinoptilotlite. This is available as powders and granules from a number of sources including GSA Resources which is a subsidiary of the Saint Cloud Mining Company in Winston, N. Mex. The portion of the composition desired to constitute a particulate zeolite is in the range of 1-20% by weight, preferably 8-12% by weight.

To prepare the compositions of the invention, it is generally only necessary to form an intimate admixture of the components. The components may be added in any order, although it is preferable to mix the highly hydroxylated nanoparticulate fumed silica such as Cab-O-Sil® EH-5 with a carrier as a separate process, which mixture can then readily be handled, and then added to the additional components. Since hydroxylated fumed silica is highly electromagnetic it readily attaches to less electronegative carriers. A good example is the use of hydroxlyated fumed silica in cat deodorizer wherein it is coated onto a bentonite or zeolite followed by addition of the other materials. The carrier to be used for any admixture needs to be determined empirically.

Methods of Use

A major application of the compositions of the invention is the remediation of oil spills, whether on water or on land. The oil is quite likely to contain not only hydrocarbons, but also malodorous materials and toxic heavy metals. Thus, generally, it will be desirable to include in the composition the components that will capture malodors such as highly hydroxylated fumed silica and components that will track heavy metals such as nanocaged cation exchangers. The compositions are buoyant and have a specific gravity of less than one (<1) and will thus float on water.

In general, the amount of the composition to be applied to the spill is approximately 0.01%-50% by weight based on the total weight of the spill. Higher amounts, of course, may also be applied and may be necessary in some cases.

For small spills on water, either saltwater or freshwater, the composition may be broadcast directly onto the spill, spreading a thin layer from the outer edge into the middle of the spill. It is not necessary to agitate the mixture, but this is often beneficial. If the spill on water is larger, compositions may be deployed with an airstream directed at the leading edge of the spill tuning the rate of delivery so as to prevent any static buildup. If equipment is used to deliver the composition, therefore, it should be grounded. If the oil is not overly concentrated in heavier crude, it may not be necessary to agitate the mixture, but if desired, mixing can be done by using wave actions, pool mixers or air jets below the surface of the water. Agitation is indicated when the spill has been previously treated with other agents or dispersants or when it has a high percentage of crude oil with a high asphaltenic content. Even submerged oil will rise to the surface when blended with the compositions.

If the oil spill is on land, application is similar to that for water-based spills and the blended material may be collected and swept up using industrial vacuum cleaners, brooms or shovels.

In the event that oil and tar balls become buried in the sand due to washing up on beaches and then subsequently being covered with additional sand, the compositions can be placed on the surface of the sand to collect the oil and tar at the time it washes up thus preventing the buildup and burial of these materials. Physical objects may also be treated with the compositions including structures such as piers.

The compositions can also be applied to plants such as reeds, aquatic plants and the like by physically contacting the composition with the plant material either by hand or using other appropriate application means to spread the compositions on the surface of the plants.

In general, elevated temperatures aid the effectiveness of the compositions in reclaiming the spills. A variety of equipment may be used to apply the compositions to the spill, including hand powered personal applicators, truck-trailer delivery or aerial application.

For mediation of decomposed animal, plant, or other waste material, similar application to assure physical contact with the decomposed material is required.

The following examples are offered to illustrate but not to limit the invention.

EXAMPLE 1

Effect of Alkylation

Two grams of material were added 50 mL of oil and parameters were assessed. No mixing. (5—Best; 1—Absence or None)

TABLE 1

Effect of Alkylation

| | Crude: | | | | | | | |
|---|---|---|---|---|---|---|---|---|
| | TS-530 | | TS-610 | | TS-720 | | All TS | |
| Quality | Heavy | Light | Heavy | Light | Heavy | Light | Heavy | Light |
| Tme to Kake ™* | 2 | 3 | 4 | 4 | 2 | 5 | 2 | 4 |
| Quality of Kake ™ | 2 | 4 | 2 | 4 | 2 | 4 | 5 | 4 |
| Odorless | 0 | 0 | 0 | 1 | 0 | 0 | 0 | 2 |
| Stickiness | 1 | 3 | 2 | 2 | 2 | 2 | 4 | 5 |

EXAMPLE 2

Effect of Fumed Silica

Two grams of material were added 50 mL of oil and parameters were assessed. No mixing. (5—Best; 1—Absence or None)

TABLE 2

Effect of Fumed Silica

| | Crude: | | | | | |
|---|---|---|---|---|---|---|
| | All TS | | EH-5 | | All TS + EH-5 | |
| Quality | Heavy | Light | Heavy | Light | Heavy | Light |
| Tme to Kake ™ | 2 | 4 | 4 | 4 | 2 | 4 |
| Quality of Kake ™ | 5 | 4 | 1 | 4 | 4 | 4 |
| Odorless | 0 | 2 | 4 | 5 | 4 | 4 |
| Stickiness | 4 | 5 | 2 | 2 | 2 | 2 |

EXAMPLE 3

Effect of Perlite and Final Formulation

Two grams of material were added 50 mL of oil and parameters were assessed. No mixing. (5—Best; 1—Absence or None)

TABLE 3

Effect of Perlite and Final Formulation

| | Crude: | | | | | |
|---|---|---|---|---|---|---|
| | Perlite | | All TS + EH-5 | | Sea ReClaim™* | |
| Quality | Heavy | Light | Heavy | Light | Heavy | Light |
| Tme to Kake | 2 | 2 | 2 | 4 | 5 | 5 |
| Quality of Kake | 2 | 4 | 4 | 4 | 5 | 5 |
| Odorless | 0 | 0 | 4 | 4 | 4 | 4 |
| Stickiness | 2 | 3 | 2 | 2 | 1 | 0 |

EXAMPLE 4

Effect on Heavy Metals

Stock solution containing each of the metal compounds was prepared. The equivalent of 80 mg of ATS in Sea ReClaim™ was weighed out for each. The Sea ReClaim™ was then added onto the surface of the solution and left undisturbed for 2 hours. Samples of the solutions were taken and submitted to Mass Spec analysis.

TABLE 4

Effect on Heavy Metals

| | Initial Conc. (ppb) | Final Conc. (ppb) | EPA Limits (ppb) |
|---|---|---|---|
| Lead | 13.7 | 1.51 | <15 |
| Mercury | 18.5 | 1.66 | <2 |
| Arsenic | 21.2 | 6.89 | <10 |

EXAMPLE 5

Pick-up Ratio/Type of Crude

Materials for Example 1-4 were combined in a final admixture at optimal levels and evaluated for a final pick-up ratio based on the type of crude (See Tables).

TABLE 5

Pick-up Ratio/Type of Crude

| | Pick-Up Ratio/Type of Crude | | | | |
|---|---|---|---|---|---|
| Type of Crude | Light | Moderate | Mod/Heavy | Heavy | Dispersant Treated |
| Viscosity | Low | Med | Med/High | High | Very High |
| Pickup Ratio (Oil/Sorbent) | 8.2 | 16.4 | 32.8 | 66 (EST*) | 66 (EST) |
| Gallons Absorbed/ lb Sea ReClaim™ | 7.5 | 15 | 30 | 60 (EST) | 60 (EST) |

*Estimated

EXAMPLES 6-10

Water samples were obtained from five wells located on a U.S. Armed Forces Military Base within the United States. An aliquot of the water was analyzed using a licensed external laboratory. An additional aliquot was mixed with an admixture of alkylated silicas in the ratio of 1:1:1. The resultant mixture was agitated for approximately three (3) minutes and left to rest for three (3) minutes. This was repeated an additional two times. The mixture was then separated into the aqueous layer and the sediment. The aqueous layer was sent to the same laboratory mentioned above. The results of the analysis are show in Tables 6-10 (*ND=not detectable, but tested).

TABLE 6

WELL SITE 297

| | Concentration in PPB | | |
|---|---|---|---|
| Contaminant Compound | BEFORE | AFTER | % Reduction |
| 1,2,4-Trimethylbenzene | 120 | ND | 100% |
| 1,2-Dichloroethane | 920 | ND | 100% |
| 1,3,5-Trimethylbenzene | 58 | ND | 100% |
| Benzene | 6900 | 530 | 92% |
| Ethylbenzene | 1000 | 12 | 99% |
| Isopropylbenzene | 30 | ND | 100% |
| m,p-Xylene | 900 | 12 | 99% |
| Naphthalene | 92 | ND | 100% |
| N-Propylbenzene | 76 | ND | 100% |
| o-Xylene | 190 | 3.2 | 98% |
| Toluene | 430 | 17 | 96% |
| GRO (C4-C12) | 19000 | 1900 | 90% |
| C13-C40 | 1400 | 84 | 94% |
| C13-C28 | 1200 | 67 | 94% |
| C29-C40 | 23 | ND | 100% |

TABLE 7

WELL SITE 31

| | Concentration in PPB | | |
|---|---|---|---|
| Contaminant Compound | BEFORE | AFTER | % Reduction |
| 1,2,4-Trimethylbenzene | 880 | 310 | 65% |
| Benzene | 38 | 23 | 39% |
| Ethylbenzene | 680 | 290 | 57% |
| Isopropylbenzene | 99 | 33 | 67% |
| m,p-Xylene | 930 | 400 | 57% |
| Naphthalene | 310 | 170 | 45% |
| n-Butylbenzene | 57 | ND | 100% |
| N-Propylbenzene | 190 | 55 | 71% |
| sec-Butylbenzene | 30 | 9.2 | 69% |
| p-Isopropyltoluene | 28 | 8 | 71% |
| Methyl-t-Butyl Ether (MTBE) | 240 | 83 | 65% |
| C13-C40 | 750000 | 1800 | 100% |
| C13-C28 | 740000 | 1700 | 100% |
| C29-C40 | ND* | ND | — |

TABLE 8

WELL SITE 25

| | Concentration in PPB | | |
|---|---|---|---|
| Contaminant Compound | BEFORE | AFTER | % Reduction |
| 1,2,4-Trimethylbenzene | 530 | ND | 100% |
| Trichloroethene | 59000 | 3700 | 94% |

TABLE 9

WELL SITE 14

| | Concentration in PPB | | |
|---|---|---|---|
| Contaminant Compound | BEFORE | AFTER | % Reduction |
| cis 1,2-Dichloroethene | 0.44 | ND | 100% |
| Trichloroethene | 91 | 3 | 97% |

TABLE 10

WELL SITE 18

| | Concentration in PPB | | |
|---|---|---|---|
| Contaminant Compound | BEFORE | AFTER | % Reduction |
| cis 1,2-Dichloroethene | 14 | 3.5 | 75% |
| Trichloroethene | 560 | 37 | 93% |

EXAMPLE 11

MMS Testing and Evaluation

Sea ReClaim™ (the product of Example 5) was compared to a variety of commercially available sorbing materials to show differential properties (See Table 11).

TABLE 11

MMS Testing and Evaluation (table is in two parts)

| Sorbent or Trade Name | EPA Listing (Reviewed w/Letter) | Natural Organic | Natural Inorganic | Effective with Sheens | Flammable | Recyclable | Reusable | Coalescences on Floating | Odor Control | Self-Aggregating | Self-Coalescing | Pb & Mercury Removal | Sinks to Bottom over time | Oil Recoverable | Perpetually Buoyant | Material |
|---|---|---|---|---|---|---|---|---|---|---|---|---|---|---|---|---|
| Sea ReClaim™ | Y | | ✓ | ✓ | | ✓ | ✓ | ✓ | ✓ | ✓ | ✓ | ✓ | | ✓ | ✓ | Natural Inorganic Material |
| Volcanic Ash | — | | ✓ | | | | | | | | | | ✓ | | | Volcanic Ash |
| Wood Cellulose Fiber | — | ✓ | | | | | | | | | | | ✓ | | | Wood Cellulose Fiber |
| Oclansorb | Y | ✓ | | | ✓ | | | | | | | | ✓ | | | Wood |
| Redwood Fibers | — | ✓ | | | | | | | | | | | ✓ | | | Redwood Fibers Ground |
| Best-Sorb | Y | ✓ | | | ✓ | ✓ | ✓ | | | | | | ✓ | | | Natural Cellulose |
| Absorbent W | Y | ✓ | | | ✓ | ✓ | ✓ | | | | | | ✓ | | | Treated Cellulose |
| CAP | Y | ✓ | | | | | | | | | | | ✓ | | | Heat Treated Cork |
| Cellusorb | Y | ✓ | ✓ | ✓ | | | | | | | | | ✓ | | | Wood Fiber, Clay, SiO$_2$ |
| Absorbent (NWT) | Y | ✓ | | | | ✓ | ✓ | | | | | | ✓ | | | Cellulose |
| Peat Sorb | Y | ✓ | | | | | | | | | | | ✓ | | | Peat Moss, Treated |
| Wheat Straw | — | ✓ | | | | | | | | | | | ✓ | | | Wheat Straw |
| Vermiculite | Y | | ✓ | | | | | | | | | | ✓ | | | Vermiculite |
| Corncob | — | ✓ | | | | ✓ | ✓ | | | | | | ✓ | | | Corncob Ground |
| Peanut Hulls | — | ✓ | | | | ✓ | | | | | | | ✓ | | | Peanut Hulls, Ground |
| Perlite | — | | ✓ | | | | | | | | | | ✓ | | | Perlite |
| Sawdust | — | ✓ | | | | | | | | | | | ✓ | | | Sawdust |
| Black D | Y | ✓ | | | ✓ | | | | | | | | ✓ | | | Ground Vulcanized Rubber |
| Oil Sponge | Y | ✓ | | | | | | | | | | | ✓ | | | Reclaimed Cotton Fiber |

TABLE 11-continued

MMS Testing and Evaluation (table is in two parts)

| Sorbent | | | | | |
|---|---|---|---|---|---|
| Corn Cobs | Y | ✓ | ✓ | | Treated Organic |
| Clay | Y | ✓ | ✓ | | Polypropylene |

MMS Testing & Evaluation of Sorbents

| Sorbent or Trade Name | Buoyancy Test (Pass/Fail) | Density (g/cm³) | Diesel Fuel Uptake (g/g) 24 hr. | Light Crude Uptake (g/g) 24 hr. | Heavy Crude Uptake (g/g) 24 hr. | Material |
|---|---|---|---|---|---|---|
| Sea ReClaim ™ | P | 0.120 | 7.8 | 8.2 | 32.8 | Natural Inorganic Material |
| Volcanic Ash | — | — | 5.0 | 7.2 | 18.1 | Volcanic Ash |
| Wood Cellulose Fiber | — | — | 9.0 | 11.4 | 17.3 | Wood Cellulose Fiber |
| Oclansorb | F | 0.105 | 6.4 | 9.2 | 13.8 | Wood |
| Redwood Fibers | — | — | 6.4 | 6.5 | 11.8 | Redwood Fibers Ground |
| Best-Sorb | P | 0.098 | 6.1 | 10.0 | 11.0 | Natural Cellulose |
| Absorbent W | P | 0.069 | 2.9 | 6.1 | 7.3 | Treated Cellulose |
| CAP | P | 0.143 | 4.4 | 7.0 | 7.3 | Heat Treated Cork |
| Cellusorb | P | 0.160 | 4.2 | 6.5 | 7.0 | Wood Fiber, Clay, SiO$_2$ |
| Absorbent (NWT) | F | 0.099 | 2.3 | 5.3 | 6.5 | Cellulose |
| Peat Sorb | F | 0.195 | 3.0 | 5.7 | 6.4 | Peat Moss, Treated |
| Wheat Straw | — | — | 1.8 | 2.4 | 6.4 | Wheat Straw |
| Vermiculite | P | 0.158 | 3.3 | 5.3 | 6.2 | Vermiculite |
| Corncob | — | — | 3.8 | 4.7 | 5.6 | Corncob Ground |
| Peanut Hulls | — | — | 2.2 | 2.2 | 4.3 | Peanut Hulls, Ground |
| Perlite | — | — | 3.0 | 3.3 | 4.0 | Perlite |
| Sawdust | — | — | 2.8 | 3.6 | 3.7 | Sawdust |
| Black D | F | 0.386 | 2.4 | 3.5 | 2.3 | Ground Vulcanized Rubber |
| Oil Sponge | F | 0.306 | 1.1 | 2.0 | 2.0 | Reclaimed Cotton Fiber |
| Corn Cobs | P | 0.178 | 0.7 | 1.5 | 1.0 | Treated Organic |
| Clay | F | 1.027 | 0.3 | 0.6 | 0.7 | Polypropylene |

The invention claimed is:

1. A composition that comprises alkylated fumed silica nanoparticles and nanostrands that sorbs hydrocarbons to form a solid mass that is buoyant in water.

2. The composition of claim 1 which both absorbs and adsorbs said hydrocarbons.

3. The composition of claim 1 wherein said alkylation comprises multiplicities of methyl groups.

4. The composition of claim 3 wherein said silica nanoparticles and nanostrands comprise a mixture of:
   fumed silica treated with dimethyl dichlorosilane,
   fumed silica treated with polydimethyl siloxane, and
   fumed silica treated with hexamethyldisilazane.

5. The composition of claim 1 which further comprises granules of porous heat-expandable siliceous volcanic rock.

6. The composition of claim 1 which further comprises a sorbent for malodors associated with hydrocarbons.

7. The composition of claim 6 wherein said sorbent is a high surface area fumed silica treated with alkoxide and having a high degree of hydroxyl groups on said surface.

8. The composition of claim 1 which further includes an adsorbent for heavy metals.

9. The composition of claim 8 wherein said adsorbent is a nanocaged cation exchanger.

10. The composition of claim 6 which further includes an adsorbent for heavy metals.

11. The composition of claim 10 wherein said adsorbent is a nanocaged cation exchanger.

12. The composition of claim 6 which further contains an adsorbent for nitrogen compounds.

13. The composition of claim 12 wherein said adsorbent is a zeolite.

\* \* \* \* \*